US009563270B2

(12) United States Patent
Tichenor et al.

(10) Patent No.: US 9,563,270 B2
(45) Date of Patent: Feb. 7, 2017

(54) HEAD-BASED TARGETING WITH PITCH AMPLIFICATION

(71) Applicant: MICROSOFT TECHNOLOGY LICENSING, LLC, Redmond, WA (US)

(72) Inventors: James Tichenor, Seattle, WA (US); Aaron Mackay Burns, Newcastle, WA (US); Jamie Marconi, Bellevue, WA (US); Bharat Ahluwalia, Redmond, WA (US); Bede Jordan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 19 days.

(21) Appl. No.: 14/583,459

(22) Filed: Dec. 26, 2014

(65) Prior Publication Data

US 2016/0187971 A1 Jun. 30, 2016

(51) Int. Cl.
*G06F 3/01* (2006.01)
*G06F 3/0481* (2013.01)

(52) U.S. Cl.
CPC ............... *G06F 3/013* (2013.01); *G06F 3/012* (2013.01); *G06F 3/0481* (2013.01)

(58) Field of Classification Search
CPC ........ G06F 3/012; G06F 3/013; G06F 3/0481; G06F 3/04815; G06F 3/04817
See application file for complete search history.

(56) References Cited

U.S. PATENT DOCUMENTS

| | | | | |
|---|---|---|---|---|
| 7,961,117 | B1 | 6/2011 | Zimmerman et al. | |
| 8,625,200 | B2 | 1/2014 | Smith et al. | |
| 2004/0240708 | A1* | 12/2004 | Hu | G06F 3/012 382/103 |
| 2005/0156817 | A1* | 7/2005 | Iba | G02B 27/0093 345/8 |
| 2008/0129688 | A1* | 6/2008 | Richardson | G06F 3/04815 345/156 |

(Continued)

FOREIGN PATENT DOCUMENTS

| | | | |
|---|---|---|---|
| EP | 2541210 | A1 | 1/2013 |
| EP | 2752733 | A1 | 7/2014 |
| WO | 0017848 | A1 | 3/2000 |

OTHER PUBLICATIONS

Diaz, et al., "Real-time Recording and Classification of Eye Movements in an Immersive Virtual Environment", In Journal of vision, vol. 13, No. 12, Oct. 10, 2013, 7 pages.

(Continued)

*Primary Examiner* — Tom Sheng
(74) *Attorney, Agent, or Firm* — Brianna Hinojosa-Flores; Judy Yee; Micky Minhas

(57) ABSTRACT

A gaze vector of a human subject is translated to a targeting vector that defines focus within a graphical user interface. Sensor data is received from a sensor system indicating pitch angle of a head of the human subject defining the gaze vector. The pitch angle is translated to a scaled pitch angle according to a pitch scaling function that increases amplification of the pitch angle in one or more directions as the pitch angle exceeds a start angle threshold in each of the one or more directions. The scaled pitch angle is output as a component of the targeting vector.

20 Claims, 5 Drawing Sheets

(56) References Cited

U.S. PATENT DOCUMENTS

2010/0321482 A1* 12/2010 Cleveland ............... G06F 3/012 348/78
2011/0128223 A1 6/2011 Lashina et al.
2011/0199202 A1* 8/2011 De Mers .................. A61B 5/18 340/439
2012/0075166 A1 3/2012 Marti et al.
2013/0021323 A1* 1/2013 Chang ................. G06F 3/04815 345/419
2013/0063340 A1* 3/2013 Mondragon ............. G09G 5/00 345/156
2013/0063477 A1 3/2013 Richardson et al.
2013/0191068 A1* 7/2013 Hess ...................... G01B 21/16 702/141
2014/0063198 A1* 3/2014 Boulanger ......... H04N 13/0477 348/47
2014/0085436 A1 3/2014 Page et al.
2014/0092139 A1* 4/2014 Sullivan ................... G09G 5/00 345/649
2014/0240351 A1* 8/2014 Scavezze ................ G06F 3/011 345/633
2014/0267400 A1 9/2014 Mabbutt et al.
2014/0347262 A1* 11/2014 Paek ........................ G09G 3/20 345/156

OTHER PUBLICATIONS

Peters, et al., "A head Movement Propensity Model for Animating Gaze Shifts and Blinking of Virtual Characters", In Proceedings of Computer Graphics, vol. 34, Issue 6, Dec. 2010, 8 pages.
Zeleznik, et al., "Look-That-There: Exploiting Gaze in Virtual Reality Interactions", In Technical Report CS-05, Mar. 4, 2005, 2 pages.
ISA European Patent Office, International Search Report and Written Opinion Issued in Application No. PCT/US2015/064168, Mar. 8, 2016, WIPO, 11 Pages.
IPEA European Patent Office, Second Written Opinion Issued in PCT Application No. PCT/US2015/064168, Nov. 3, 2016, WIPO, 6 pages.

* cited by examiner

HEAD-BASED TARGETING WITH PITCH AMPLIFICATION

BACKGROUND

Machines may be controlled through bodily movement of a human subject or user to perform a task. Movement of a human head, for example, may be used as a control input to an electronic device, such as a computer or gaming console. Wearable devices such as head-mounted displays or head-mounted sensors may form the basis of detecting human head movement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an aspect of the present disclosure, a gaze vector of a human subject is translated to a targeting vector. Sensor data is received from a sensor system indicating pitch angle of a head of the human subject. The pitch angle is translated to a scaled pitch angle according to a scaling function that increases amplification of the pitch angle in a first direction as the pitch angle exceeds a start angle threshold in the first direction. The scaled pitch angle may be output, in an example, as a component of the targeting vector.

DETAILED DESCRIPTION

For many humans, it may be more difficult to move their head in the vertical axis than in the horizontal axis. Head-mounted targeting devices allow users to target a particular point or region using their head position to control a targeting vector. To allow for users to more easily target items in the vertical axis, an amplified targeting vector may be obtained by amplifying a gaze vector of the user, particularly if or when the head is pitched forward or rearward. Amplification of the gaze vector enables users to more easily target items located above or below a neutral position of their head. By scaling gaze vectors upward when the user looks upward above the horizon, users are able to target items above the horizon more easily.

Applying a similar approach to downward gaze vectors helps users to more easily target items located below the horizon. However, for many humans, there is a natural asymmetry between looking upwards and downwards. Hence, asymmetry in the amplification applied to forward and rearward head pitch may be utilized to account for this natural asymmetry.

Figure 1:
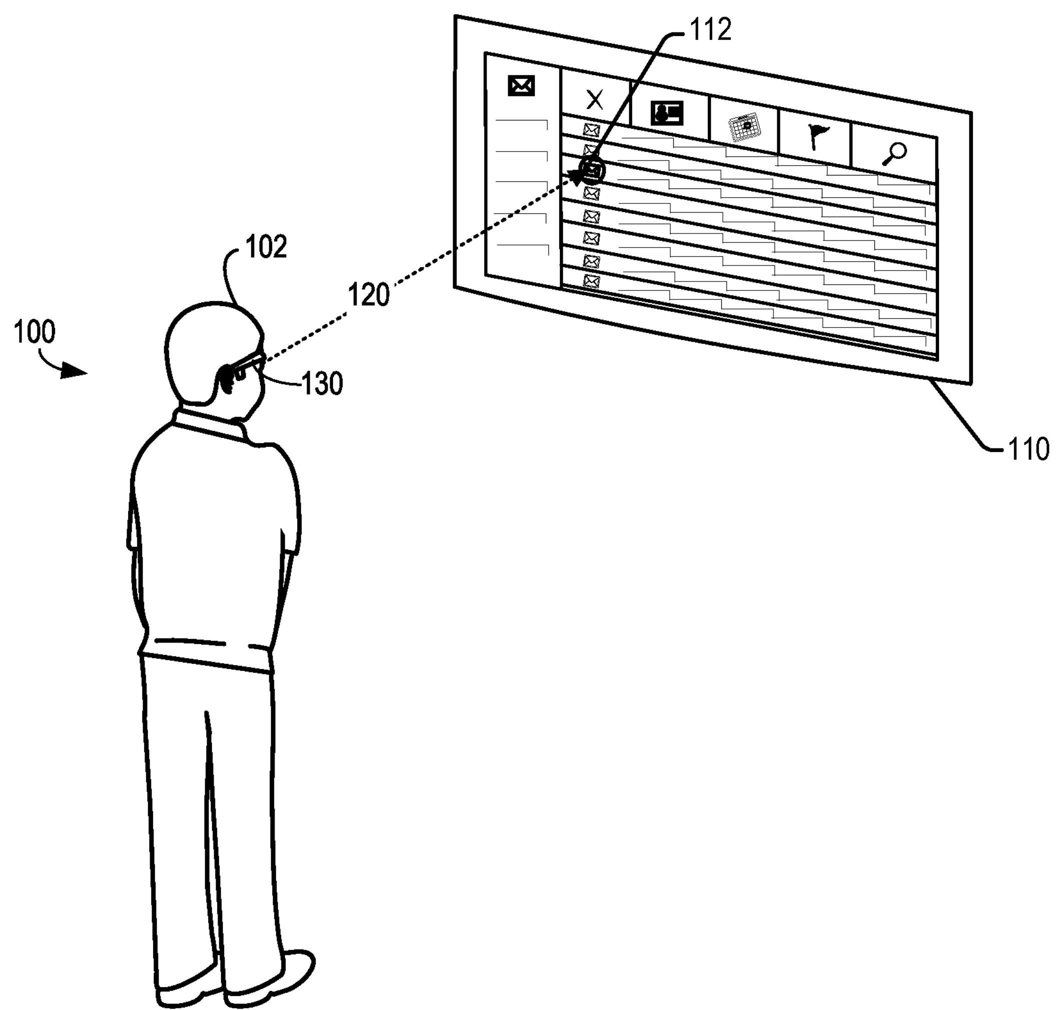
FIG. 1 depicts an example of a human subject interacting with a graphical user interface.

FIG. 1 depicts an example of a human subject 100 (i.e., user) interacting with a graphical user interface (GUI) 110. As depicted in FIG. 1, the human subject is wearing a head-mounted targeting device 130 that measures or assists in measuring a gaze vector of the human subject. In an example, head-mounted targeting device 130 may take the form of a head-mounted display device that additionally displays GUI 110. In another example, head-mounted targeting device 130 does not display a GUI, but operates in conjunction with a physically separate display device that displays GUI 110.

As an alternative or in addition to a head-mounted targeting device, an optical sensor system including one or more optical sensors may be used to image the human subject, the head of the human subject, or at least a portion of the head to measure an orientation of the head, in terms of pitch, yaw, and/or roll. Measurements of pitch, yaw, and/or roll obtained by an optical sensor system may be combined with or used independent of measurements of pitch, yaw, and/or roll obtained by a head-mounted targeting device.

A gaze vector refers to a vector in one, two, or three-dimensional physical space by which the human subject observes the physical world. A gaze vector is typically based on a measured orientation of a head 102 of the human subject in one, two, or three-dimensional physical space. Additionally, the gaze vector may be based on an eye orientation of the human subject in one, two, or three-dimensional physical space relative to head 102.

The measured gaze vector may be translated to a targeting vector 120 that defines focus within a different environment, such as GUI 110. The human subject may change focus within a different environment, such as GUI 110, by changing an orientation of his or her head in physical space. For example, the human subject may tilt his or her head downward or upward (i.e., forward or rearward pitch) to indicate a change in focus downward or upward within GUI 110. As another example, the human subject may turn his or her head left or right (i.e., left or right yaw) to indicate a change in focus left or right within GUI 110.

GUI 110 may include one or more graphical elements selectable by the human subject, such as example graphical element 112. In at least some implementations, GUI 110 may include a graphical indication of a point or region of focus. In an example, GUI 110 may include a graphical highlight located at or nearby a graphical element that is actively targeted by the human subject. In another example, GUI 110 may include a graphical targeting icon that indicates a point or region of focus within GUI 110 that is actively targeted by the human subject.

The human subject may direct a user input to a point or region of focus within the graphical user interface using a variety of selection techniques, including by speaking a voice command that is detected by a microphone, by pressing a button via a physical controller, remote control, keyboard, or mouse, by a gesture using a body part such as a hand, arm, leg, foot, or other body or by blinking one or both eyes that is detected by an optical sensor, among other suitable techniques. Non-limiting examples of a user input include a user selecting an item (e.g., graphical element) within focus, applying a process to an item within focus, launching an application or opening an information window or menu associated with an item within focus. It will be understood that the above examples are to be considered non-limiting as other forms of user input and selection techniques may be used.

Figure 2:
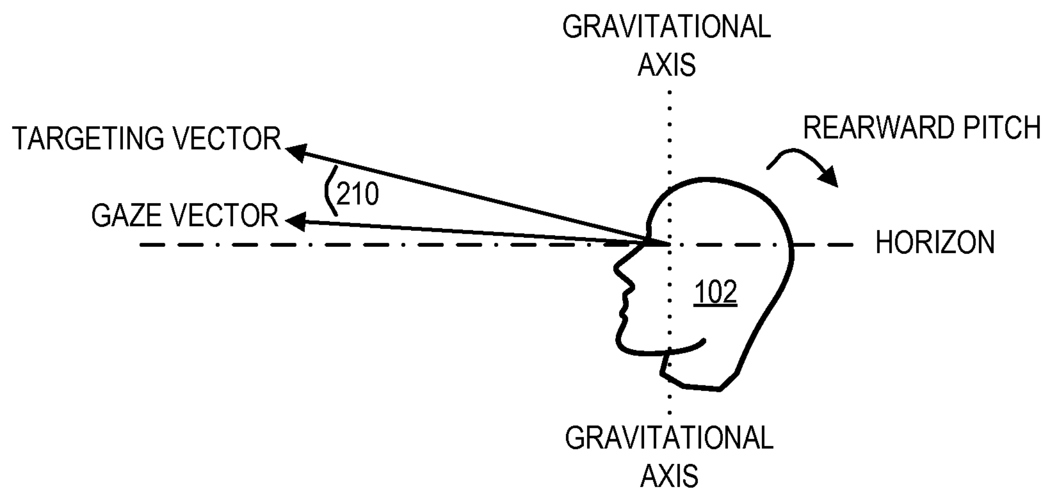
FIG. 2 depicts an example of a targeting vector scaled relative to a gaze vector of a head of a human subject in a rearward pitch direction.

FIG. 2 depicts an example of a targeting vector scaled relative to a gaze vector of head 102 of a human subject in a rearward pitch direction. In this example, a pitch angle component of the targeting vector (measured within a plane containing the gravitational axis and the horizon) is amplified in the rearward pitch direction relative to a pitch angle component of the gaze vector by an amount indicated by angle 210. By amplifying the gaze vector in the rearward pitch direction to the targeting vector, the human subject is able target a GUI with the targeting vector at a point or region within the GUI that is further from the horizon in the upward direction than otherwise provided by the gaze vector.

Figure 3:
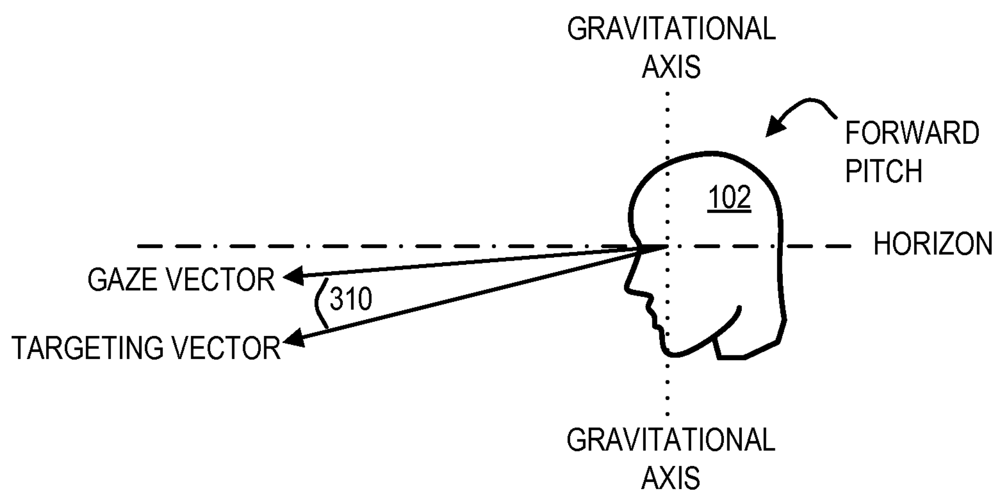
FIG. 3 depicts an example of a targeting vector scaled relative to a gaze vector of a head of a human subject in a forward pitch direction.

FIG. 3 depicts an example of a targeting vector scaled relative to a gaze vector of head 102 of a human subject in a forward pitch direction. In this example, a pitch angle component of the targeting vector is amplified in the forward pitch direction relative to a pitch angle component of the gaze vector by an amount indicated by angle 310. By amplifying the gaze vector in the forward pitch direction to the targeting vector, the human subject is able target a GUI with the targeting vector at a point or region within the GUI that is further from the horizon in the downward direction than otherwise provided by the gaze vector.

A gaze vector and a targeting vector may be represented by one or more angle components, including a pitch angle component, a yaw angle component, and a roll angle component. In FIGS. 2 and 3, the pitch angle components of the gaze vectors and the targeting vectors are depicted within a plane formed by the gravitational axis and the horizon that is orthogonal to the gravitational axis. The gravitational axis and the horizon depicted in FIGS. 2 and 3 are each orthogonal to a pitch axis about which head 102 of the human subject rotates in the forward and rearward pitch directions. Within the context of FIGS. 2 and 3, the gravitational axis is parallel to and/or collinear with a yaw axis about which head 102 of the human subject rotates in right and left yaw directions from the perspective of the human subject. Also within the context of FIGS. 2 and 3, the horizon is parallel to and/or collinear with a roll axis about which head 102 of the human subject rotates in right and left roll directions from the perspective of the human subject.

Figure 4:
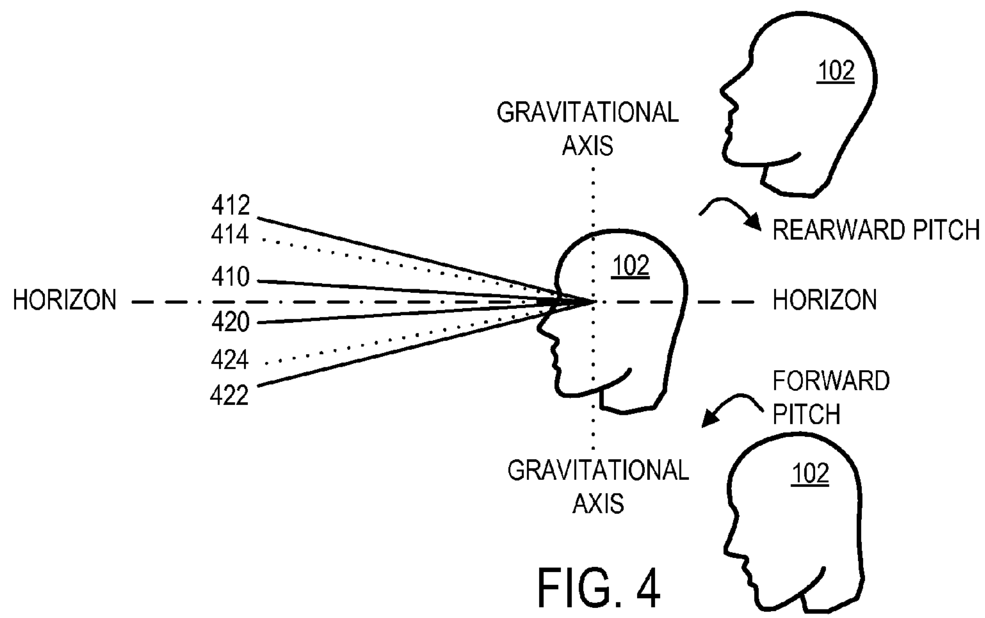
FIG. 4 depicts example pitch angle thresholds that may be applied to a pitch angle component of a gaze vector to define regions in which amplification may be initiated, increased, reduced, and/or discontinued.

FIG. 4 depicts example pitch angle thresholds that may be applied to a pitch angle component of a gaze vector to define regions in which amplification may be initiated, increased, reduced, and/or discontinued. In FIG. 4, amplification of the pitch angle component of the gaze vector may remain constant, increase and/or decrease across a range of pitch angles between a start angle threshold and an end angle threshold.

As an example, in the rearward pitch direction, an upper start angle threshold 410 and an upper end angle threshold 412 may define an angular amplification region within which the pitch angle component of the gaze vector is amplified or amplification is increased to obtain the pitch angle component of the targeting vector. As a non-limiting example, upper start angle threshold 410 may correspond to 5 degrees and upper end angle threshold 412 may correspond to 22.5 degrees in the rearward pitch direction measured relative to a horizon that is orthogonal to the gravitational axis. However, other suitable thresholds may be used.

In this example, amplification of the pitch angle is initiated and/or increased within the angular amplification region defined by upper start angle threshold 410 and upper end angle threshold 412 as compared to an interior angular region defined by the horizon and upper start angle threshold 410. This interior angular region defined by the horizon and upper start angle threshold 410 may form part of a dead zone surrounding the horizon within which the pitch angle is not amplified, substantially not amplified, or within which amplification is substantially lower than the amplification performed within the angular amplification region exceeding the upper start angle threshold in the rearward pitch direction.

Use of a dead zone or neutral region around the horizon recognizes that many humans cannot locate their exact center head gaze (e.g., on an object such as a GUI). However, humans tend to notice when their gaze moves upward or downward a threshold distance (e.g., ~5% off center in any direction). Accordingly, amplification may not be used or may be reduced in an angular region surrounding the horizon.

Additionally or alternatively, amplification of the pitch angle may be initiated and/or increased within the angular amplification region defined by upper start angle threshold 410 and upper end angle threshold 412 as compared to an outer angular region defined by the upper end angle threshold 412 and the gravitational axis above the horizon.

In the forward pitch direction, a lower start angle threshold 420 and a lower end angle threshold 422 may define an angular amplification region within which the pitch angle component of the gaze vector is amplified to obtain the pitch angle component of the targeting vector. As a non-limiting example, lower start angle threshold 420 may correspond to 35 degrees and lower end angle threshold 422 may correspond to 49.5 degrees in the forward pitch direction measured relative to a horizon that is orthogonal to the gravitational axis. However, other suitable thresholds may be used.

In this example, amplification of the pitch angle is initiated and/or increased within the angular region defined by lower start angle threshold 420 and lower end angle threshold 422 as compared to an interior angular region defined by the horizon and lower start angle threshold 420. This interior angular region defined by the horizon and lower start angle threshold 420 may form part of a dead zone surrounding the horizon within which the pitch angle is not amplified or within which amplification is substantially lower than the amplification performed within the angular amplification region exceeding the lower start angle threshold in the forward pitch direction.

Additionally or alternatively, amplification of the pitch angle may be initiated and/or increased within the angular amplification region defined by lower start angle threshold 420 and lower end angle threshold 422 as compared to an outer angular region defined by the lower end angle threshold 422 and the gravitational axis below the horizon.

FIG. 4 further depicts an example in which amplification of a rearward pitch of head 102 reaches its maximum at an upper inflection angle 414. In the example depicted in FIG.

4, the upper inflection angle 414 is closer to upper end angle threshold 412 than upper start angle threshold 410. In another example, upper inflection angle 414 corresponding to the maximum amplification for a rearward pitch of head 102 may be closer to upper start angle threshold 410 than upper end angle threshold 412, or equidistant to upper start angle threshold 410 and upper end angle threshold 412. In other examples, increased or initiated amplification in the rearward pitch direction may be constant across pitch angles between upper start angle threshold 410 and upper end angle threshold 412. In still further examples, the rearward pitch direction may include two or more upper inflection angles at which amplification reaches its maximum or minimum.

Amplification of a forward pitch of head 102 reaches its maximum at a lower inflection angle 424. In the example depicted in FIG. 4, lower inflection angle 424 is closer to lower end angle threshold 422 than lower start angle threshold 420. In another example, lower inflection angle 424 corresponding to the maximum amplification for a forward pitch of head 102 may be closer to lower start angle threshold 420 than lower end angle threshold 422, or equidistant to lower start angle threshold 420 and lower end angle threshold 422. In other examples, increased or initiated amplification in the forward pitch direction may be constant across pitch angles between lower start angle threshold 420 and lower end angle threshold 422. In still further examples, the forward pitch direction may include two or more lower inflection angles at which amplification reaches its maximum or minimum.

Figure 5:
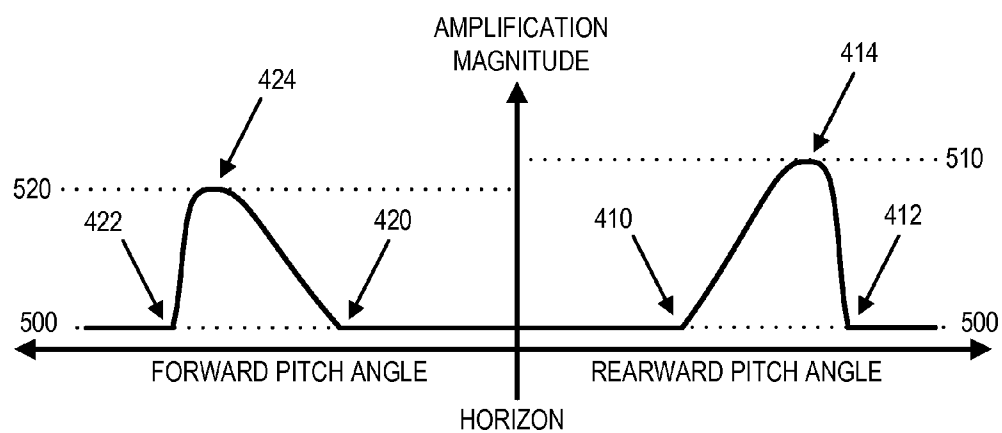
FIG. 5 is a graph depicting an example relationship between pitch angle and amplification magnitude that may be defined by a scaling function.

FIG. 5 is a graph depicting an example relationship between pitch angle and amplification magnitude that may be defined by a scaling function. The example relationship depicted in FIG. 5 may take the form of a scaling function that is applied to a gaze vector to obtain a targeting vector.

Within FIG. 5, previously described upper start angle threshold 410, upper inflection angle 414, and upper end angle threshold 412 of FIG. 4 are depicted in the rearward pitch direction. Amplification of the pitch angle is initiated and/or increased within the angular amplification region between upper start angle threshold 410 and upper end angle threshold 412, with a maximum amplification magnitude 510 in the rearward pitch direction corresponding to upper inflection angle 414.

FIG. 5 further depicts a zero, substantial zero, or reduced amplification magnitude 500. Amplification magnitude 500 may form part of a dead zone surrounding the horizon, for example. FIG. 5 further depicts the lower start angle threshold 420, lower inflection angle 424, and lower end angle threshold 422 in the forward pitch direction. Amplification of the pitch angle is initiated and/or increased within the angular amplification region between lower start angle threshold 420 and lower end angle threshold 422, with a maximum amplification magnitude 520 in the forward pitch direction corresponding to lower inflection angle 424.

In the example depicted in FIG. 5, maximum amplification magnitude 520 in the forward pitch direction differs from (e.g., is less than) the maximum amplification magnitude 510 in the rearward pitch direction. This difference in amplification between rearward and forward pitch corresponds to asymmetric scaling of the gaze vector across a range of pitch angles. In another example, maximum amplification magnitude 520 may be greater than maximum amplification magnitude 510, or maximum amplification magnitude 520 may be equal to maximum amplification magnitude 510 in the forward and rearward pitch directions.

It will be understood that the example relationship depicted in FIG. 5 is a non-limiting example. Other suitable relationships between pitch angle and amplification magnitude may be used, and may be described by a function exhibiting any one or more of the following features: linear, non-linear, step-wise, smooth, increasing, decreasing, symmetric, asymmetric. Any suitable selection or combination of such features may be used to provide a particular mapping between gaze vector and targeting vector. Such mapping may be dependent on implementation, and may be predefined, programmatically re-defined over time responsive to observation and feedback, and/or user-defined. As subsequently described in further detail, a relationship between pitch angle and amplification magnitude may be described by one or more linear and/or non-linear functions over a range of pitch angles, with the relationship exhibiting a symmetric or asymmetric relationship about a datum, such as the horizon, for example.

Amplification of the pitch angle component of the gaze vector, as defined by a scaling function, may described as being linear or non-linear across a range of pitch angles in the rearward and/or forward pitch directions. Non-linearity may be represented or otherwise defined by a non-linear scaling function across any suitable range of pitch angles. A non-linear scaling function may include or take the form of a step function with a finite number of increasing and/or decreasing amplification magnitudes, a smooth function with many, infinite, or near infinite number of increasing and/or decreasing amplification magnitudes (e.g., an exponential function, a non-linear ramp function, etc.), or a combination thereof. A non-linear scaling function may include a subset of angular ranges over which the amplification magnitude is linear, but bounded on one or both sides by a non-linear portion of the non-linear scaling function.

In another example, amplification of the pitch angle may linearly increase (e.g., a linearly increasing ramp function), linearly decrease (e.g., a linearly decreasing ramp function), or remain constant in one of the rearward pitch direction or forward pitch direction, while amplification of the pitch angle may be non-linear in another one of the rearward pitch direction or forward pitch direction. In yet another example, amplification of the pitch angle may linearly increase, linearly decrease, or remain constant in each of the rearward pitch direction and the forward pitch direction.

A scaling function may be symmetric or asymmetric about a datum, such as the horizon, to provide different amplification in each pitch direction. As one example, a pitch scaling function may be asymmetric about a datum such as the horizon in which the upper end angle threshold and the lower end angle threshold have different angle magnitudes relative to the horizon. As another example, a pitch scaling function may be asymmetric about a datum such as the horizon in which the upper start angle threshold and the lower start angle threshold have different angle magnitudes relative to the horizon. As yet another example, a pitch scaling function may be asymmetric about a datum, such as the horizon, such that an angular rate of change of amplification of the pitch angle exceeding the upper start angle threshold in the rearward pitch direction differs from the pitch angle exceeding the lower start angle threshold in the forward pitch direction. A pitch scaling function may be symmetric about a data such as the horizon if the upper start angle threshold and the lower start angle threshold have the same angle magnitudes relative to a datum, such as the horizon, and an angular rate of change of amplification magnitude is the same in each direction relative to the datum.

Figure 6:
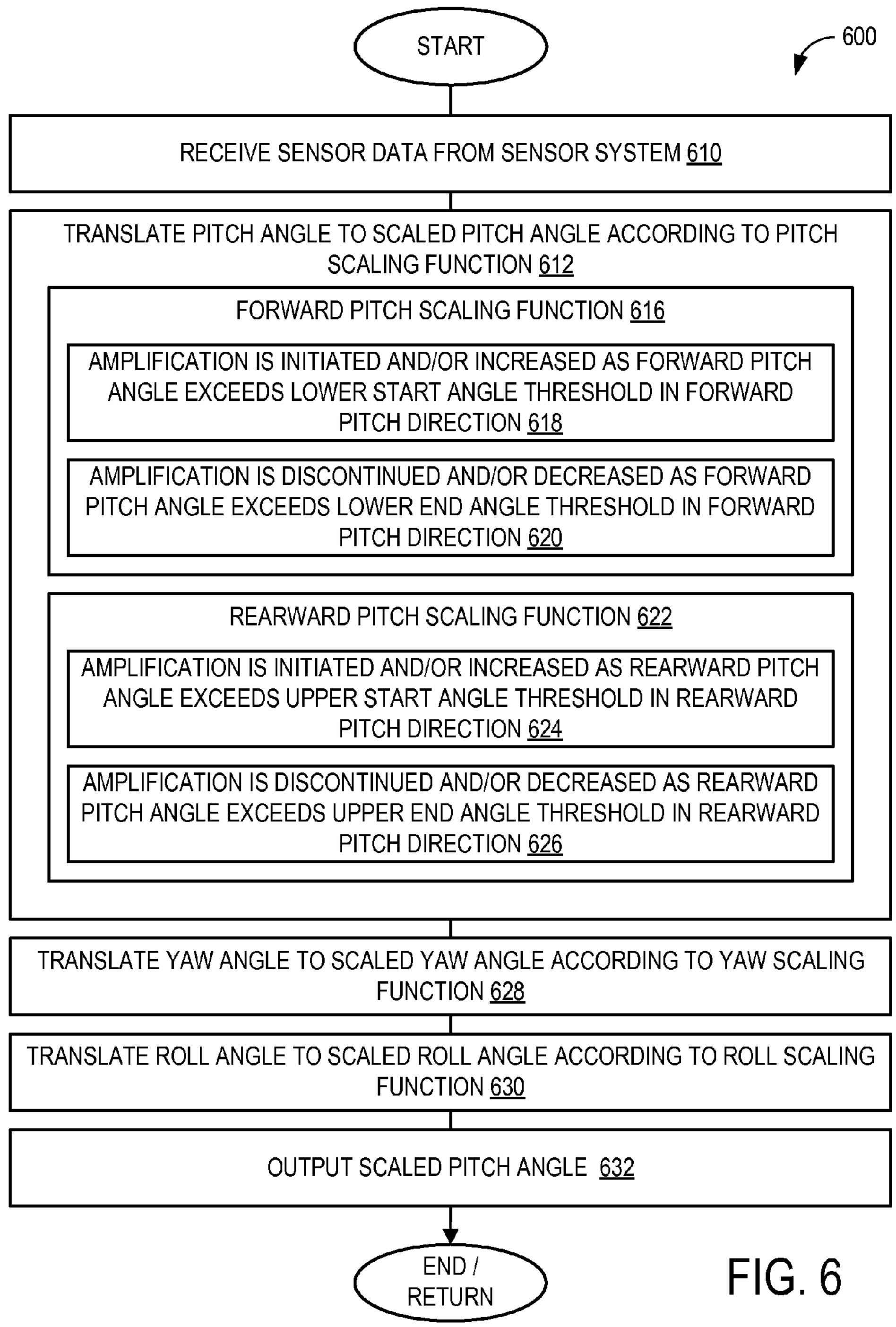
FIG. 6 is a flow diagram depicting an example method for translating a gaze vector of a human subject to a targeting vector.

FIG. 6 is flow diagram depicting an example method 600 for translating a gaze vector of a human subject to a targeting vector. Within method 600, a pitch angle of a gaze vector is translated to a scaled pitch angle of a targeting vector according to a scaling function that defines an amplification magnitude that varies with pitch angle of the gaze vector.

At 610, the method includes receiving sensor data from a sensor system indicating pitch angle of a head of the human subject. In an example, the sensor system may form part of a head-mounted targeting device worn by the human subject. In another example, the sensor system may include one or more optical sensors that image the head of the human subject, and from which head orientation (including pitch angle) may be measured.

In at least some implementations, pitch angle may be measured relative to a gravitational vector or gravitational axis. A gravitational vector or gravitational axis may be identified by detecting an acceleration constant within the sensor data received from the sensor system. As an example, the sensor system may include one or more accelerometers, gyroscopes, inertial sensors, tilt sensors, etc. that provide a measure or indication of orientation, motion, and/or acceleration.

Pitch angle may form a component of a gaze vector. The gaze vector may further include a yaw angle component and/or a roll angle component, depending on implementation. The sensor data received at 610 may further indicate yaw angle and/or roll angle of the head of the human subject in addition to pitch angle.

At 612, the method includes translating the pitch angle to a scaled pitch angle according to a pitch scaling function. A scaling function applied to a pitch angle component of a gaze vector may be referred to as a pitch scaling function. A scaling function applied to a yaw angle may be referred to as a yaw scaling function, and a scaling function applied to a roll angle may be referred to as a roll scaling function. The pitch scaling function may include a forward pitch scaling function 616 to be applied to forward pitch angle and a rearward pitch scaling function 622 to be applied to rearward pitch angle.

As previously described with reference to FIGS. 3 and 4, a pitch scaling function may define an amplification magnitude that varies with a change in the pitch angle between a start angle threshold and an end angle threshold. A pitch scaling function may be linear or non-linear in each of the forward pitch direction and rearward pitch direction relative to a datum, such as the horizon, for example. A pitch scaling function may be symmetric or asymmetric about a datum, such as the horizon.

Forward pitch scaling function 616 may include amplification that is initiated and/or increases as the forward pitch angle exceeds a lower start angle threshold in the forward pitch direction at 618. Forward pitch scaling function 616 may include amplification that decreases and/or is discontinued as the forward pitch angle exceeds a lower end angle threshold in the forward pitch direction at 620. Amplification may be discontinued or decreased beyond an end angle threshold in either direction to reduce or eliminate scenarios in which the human subject loses or 'chases' their targeting vector (as an their amplified gaze vector).

As non-limiting examples, a forward pitch scaling function may include a linear ramp function component, a step function component, or a non-linear ramp function component beginning at the lower start angle threshold and continuing across a range of pitch angles in the forward pitch direction. Amplification may reach its maximum in the forward pitch direction at a lower inflection angle between the lower start angle threshold and the lower end angle threshold, or the maximum amplification may be at one or more of the lower start angle threshold and/or the lower end angle threshold.

Rearward pitch scaling function 622 may include amplification that is initiated and/or increases as the rearward pitch angle exceeds an upper start angle threshold in the rearward pitch direction at 624. Rearward pitch scaling function 622 may include amplification that decreases and/or is discontinued as the rearward pitch angle exceeds an upper end angle threshold in the rearward pitch direction at 626.

As non-limiting examples, a rearward pitch scaling function may include a linear ramp function component, a step function component, or a non-linear ramp function component beginning at the upper start angle threshold and continuing across a range of pitch angles in the rearward pitch direction. Amplification may reach its maximum in the rearward pitch direction at an upper inflection angle between the upper start angle threshold and the upper end angle threshold, or the maximum amplification may be at one or more of the upper start angle threshold and/or the upper end angle threshold.

At 628, the method includes translating the yaw angle to a scaled yaw angle according to a yaw scaling function. In an example, the yaw scaling function amplifies the yaw angle in one or more directions. A yaw scaling function may be linear, non-linear, symmetric, and/or asymmetric across some or all yaw angles. The yaw scaling function may differ from the pitch scaling function or may be identical to the pitch scaling function. As an example, the yaw scaling function differs from the pitch scaling function by a magnitude of amplification across a range of angles. In some implementations, the method at 628 may be omitted, such as where yaw angle scaling is not provided or where yaw angle does not form a component of the gaze vector or targeting vector.

At 630, the method includes translating the roll angle to a scaled roll angle according to a roll scaling function. A roll scaling function may be linear, non-linear, symmetric, and/or asymmetric across some or all roll angles. The roll scaling function may differ from the pitch scaling function and/or the yaw scaling function, or may be identical to one or more of the pitch scaling function and yaw scaling function. In some implementations, the method at 630 may be omitted, such as where roll angle scaling is not provided or where roll angle does not form a component of the gaze vector or targeting vector.

At 632, the method includes outputting the scaled pitch angle. As an example, the scaled pitch angle may be output as a component of the targeting vector defining focus within the GUI. In some implementations, the method at 632 may further include outputting the scaled yaw angle and/or scaled roll angle as components of the targeting vector, such as where the targeting vector is defined by pitch angle and additionally by yaw angle and/or roll angle.

In at least some implementations, a scaling function, such as a pitch scaling function may be user-specific. As an example, method 600 may further include referencing a user-specific pitch scaling function stored in a user profile for the human subject. A user profile may include a user identifier that is associated with a scaling function specific to that user. A human subject may access the user specific scaling function by signing or logging into an application program, or the identity of the human subject may be inferred from context.

Method 600 may further include modifying the user-specific pitch scaling function stored in the user profile over time. For example, a user-specific pitch scaling function may be modified as part of a computer training or learning component of an application program or of an operating system for use across a plurality of application programs. Modifications to a scaling function may include adjusting an amplification magnitude across one or more angles in a pitch, yaw, and/or roll coordinate frame. Additionally or alternatively, modifications to a scaling function may include adjusting one or more of the angle thresholds or inflection points of the function. In some examples, the human subject may modify a scaling function by interacting with an application program or operating system to adjust or otherwise redefine one or more values defining the scaling function.

Figure 7:
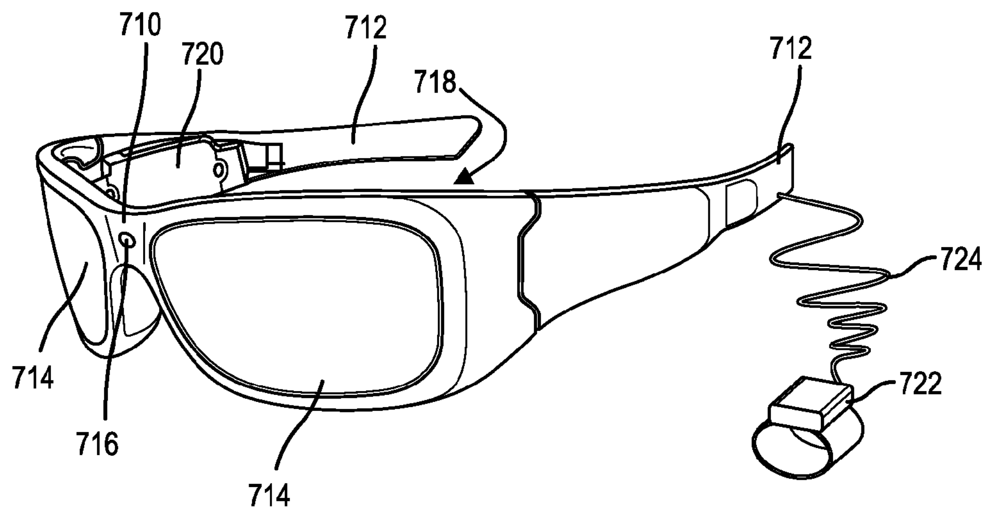
FIG. 7 is a schematic diagram depicting an example head-mounted targeting device.

FIG. 7 is a schematic diagram depicting an example head-mounted targeting device 700. Head-mounted targeting device 700 is a non-limiting example of head-mounted targeting device 130 of FIG. 1. In this example, device 700 takes the form of wearable glasses including a frame defining a nose bridge 710, left and right ear pieces 712, and left and right lens elements 714.

In at least some implementations, left and right lens elements 714 may each or collectively include one or more graphical display devices. One or more graphical display devices of device 700 may present one or more graphical user interfaces observable by a human subject while device 700 is worn by the human subject. Left and right lens elements 714 may additionally or alternatively be transparent or semi-transparent under at least some conditions. As an example, the human subject may observe graphical information of a graphical user interface presented at left and/or right lens elements 714 while additionally observing the physical world through the left and right lens elements.

In at least some implementations device 700 may include one or more optical sensors. As an example, device 700 may include an outward facing optical sensor 716. Device 700 may additionally or alternatively include one or more inwardly facing optical sensors 718 to image one or both eyes of the human subject while wearing device 700. Inwardly facing optical sensors 718 may be located along an interior region of the frame of device 700, such as along a rim of left and right lens elements 714, upon left and right lens elements 714, along bridge 710, and/or along earpieces 712. Optical sensors 718 may be used to measure an orientation of one or more eyes of the human subject.

In at least some implementations, device 700 may include an on-board integrated computing system that includes a logic machine to execute instructions and/or a storage machine that holds instructions executable by the logic machine. An example computing system is described in further detail with reference to FIG. 8. FIG. 7 schematically depicts device 700 including a logic machine and a storage machine at 720. In this example, the logic machine and storage machine are integrated with or form part of device 700.

Additionally or alternatively, device 700 may include or be configured to operate in conjunction with a remote device 730 may include a computing system that includes a logic machine and storage machine. In an example, remote device 730 may be communicatively coupled with device 700 via a wired communications link 732. In another example, device 700 may communicate with remote device 730 via wireless communications link. In this example, device 700 may further include an on-board wireless transceiver indicated schematically again at 720 to facilitate wireless communications with remote devices, such as remote device 730, for example.

In at least some implementations, remote device 730 may take the form of a hand held controller or remote control device. Remote device 730 may include one or more control elements, buttons, selectors, etc. to enable the human subject to provide a user input. As an example, the user input may take the form of a selection of a graphical element targeted by the human subject through a targeting vector within a graphical user interface presented via device 700. As another example, the user input may take the form of a command to be executed at or by a computing system on-board device 700. While remote device 730 is depicted as being of smaller scale relative to device 700, remote device 730 may take any suitable form. As an example, remote device 730 may represent a remote computing system, such as a gaming console, desktop computer, mobile computing device, server device, etc.

Device 700 may include one or more additional on-board sensors forming a sensor system. As an example, a sensor system indicated schematically again at 720 may include one or more accelerometers, inertial sensors, gyroscope sensors, tilt sensors, or other suitable orientation sensors. One or more of these sensors may be used to detect or otherwise identify a gravitational axis and/or gravitational vector, which may be used in conjunction with method 600, for example.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
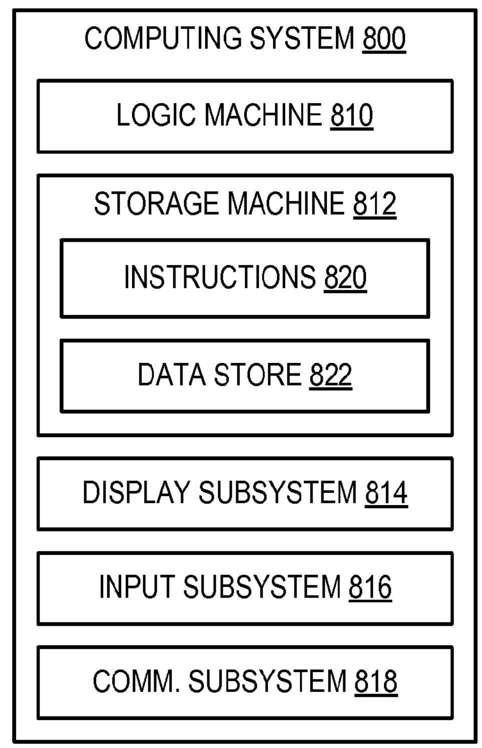
FIG. 8 is a schematic diagram depicting an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a storage machine 812. Computing system 800 may optionally include a display subsystem 814, input subsystem 816, communication subsystem 818, and/or other components not shown in FIG. 8.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions.

Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 812 includes one or more physical devices configured to hold instructions 820 executable by the logic machine to implement the methods and processes described herein. Storage machine 812 may additionally include a data store 822 to hold various forms of data. When such methods and processes are implemented, the state of storage machine 812 may be transformed—e.g., to hold different data.

Storage machine 812 may include removable and/or built-in devices. Storage machine 812 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 812 may include volatile, nonvolatile, dynamic, static, read/write, read-only, random-access, sequential-access, location-addressable, file-addressable, and/or content-addressable devices.

It will be appreciated that storage machine 812 includes one or more tangible, physical devices. However, aspects of the instructions described herein alternatively may be propagated by a communication medium (e.g., an electromagnetic signal, an optical signal, etc.) that is not necessarily held by a physical device for a finite duration.

Aspects of logic machine 810 and storage machine 812 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by storage machine 812. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 814 may be used to present a visual representation of data held by storage machine 812. This visual representation may take the form of a graphical user interface (GUI). As the herein described methods and processes change the data held by the storage machine, and thus transform the state of the storage machine, the state of display subsystem 814 may likewise be transformed to visually represent changes in the underlying data. Display subsystem 814 may include or interface with one or more display devices utilizing virtually any type of technology. Such display devices may be combined with logic machine 810 and/or storage machine 812 in a shared enclosure, or such display devices may be peripheral display devices. Display subsystem 814 may output graphical user interface data representing a graphical user interface to one or more display devices.

When included, input subsystem 816 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer/inertial sensor/tilt sensor/gyroscope sensor for motion/orientation detection and/or intent recognition; as well as electric-field sensing componentry for assessing brain activity.

When included, communication subsystem 818 may be configured to communicatively couple computing system 800 with one or more other computing devices. Communication subsystem 818 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In one example, a method for translating a gaze vector of a human subject to a targeting vector includes receiving sensor data from a sensor system indicating pitch angle of a head of the human subject, translating the pitch angle to a scaled pitch angle according to a pitch scaling function that initiates and/or increases amplification of the pitch angle in a first direction as the pitch angle exceeds a start angle threshold in the first direction, and outputting the scaled pitch angle. In one example, within the above method the pitch angle of the head of the human subject is a component of the gaze vector of the human subject, and/or outputting the scaled pitch angle includes outputting the scaled pitch angle as a component of the targeting vector, and/or the sensor data received from the sensor system further indicates a yaw angle component of the gaze vector of the human subject, and/or the method further includes translating the yaw angle to a scaled yaw angle according to a yaw scaling function that amplifies the yaw angle in one or more directions, the yaw scaling function differing from the pitch scaling function by a magnitude of amplification across a range of angles, and/or outputting the scaled yaw angle as another component of the targeting vector, and/or the targeting vector represents focus within a graphical user interface, and/or the method further includes identifying a gravitational axis based on the sensor data received from the sensor system, and/or measuring the pitch angle relative to the gravitational axis, and/or the pitch scaling function is non-linear across a range of pitch angles, and/or the pitch scaling function includes a step function component or a non-linear ramp function component beginning at the start angle threshold and continuing across a range of pitch angles in the first direction, and/or the pitch scaling function includes a linear ramp function component beginning at the start angle threshold and continuing across a range of pitch angles in the first direction, and/or the method further includes translating the pitch angle to the scaled pitch angle according to the pitch scaling function that further discontinues and/or decreases amplification of the pitch angle in the first direction as the pitch angle exceeds an end angle threshold in the first direction, and/or the pitch scaling function defines an amplification magnitude that varies with a change in the pitch angle between the start angle threshold and the end angle threshold, and/or the pitch scaling function has a maximum amplification magnitude between the start angle threshold and the end angle threshold, and/or the maximum amplification magnitude is closer to the end angle threshold than the start angle threshold, and/or the first direction is a rearward pitch direction of the head of the human subject, and the start angle threshold is an upper start angle threshold, and/or the pitch scaling function initiates and/or increases amplification of the pitch angle in a forward pitch direction opposite the rearward pitch direction as the pitch angle exceeds a lower start angle threshold in the forward pitch direction, and/or the upper start angle threshold and the lower start angle threshold define a dead zone in which the pitch angle is not amplified, and/or the pitch scaling function is asymmetric about a horizon orthogonal to a gravitational axis in which the upper start angle threshold and the lower start angle threshold have different angle magnitudes relative to the horizon, and/or the pitch scaling function is asymmetric about a horizon orthogonal to a gravitational axis such that an angular rate of change of amplification of the pitch angle exceeding the upper start angle threshold in the rearward pitch direction differs from the pitch angle exceeding the lower start angle threshold in the forward pitch direction, and/or the method further includes translating the pitch angle to the scaled pitch angle according to the pitch scaling function that further discontinues and/or decreases amplification of the pitch angle in the rearward pitch direction as the pitch angle exceeds an upper end angle threshold in the rearward pitch direction, and/or the method further includes translating the pitch angle to the scaled pitch angle according to the pitch scaling function that further discontinues and/or decreases amplification of the pitch angle in the forward pitch direction as the pitch angle exceeds a lower end angle threshold in the forward pitch direction, and/or the pitch scaling function is asymmetric about a horizon orthogonal to a gravitational axis in which the upper end angle threshold and the lower end angle threshold have different angle magnitudes relative to the horizon, and/or the pitch scaling function is a user-specific pitch scaling function, and/or the method further includes referencing the user-specific pitch scaling function stored in a user profile for the human subject.

In one example, a computing system includes an input subsystem to receive sensor data from a sensor system, a display subsystem to output graphical user interface data representing a graphical user interface to a graphical display device, a logic machine, and a storage machine holding instructions executable by the logic machine to: receive the sensor data from the sensor system indicating a pitch angle of a head of a human subject, translate the pitch angle to a scaled pitch angle according to a scaling function that: initiates and/or increases amplification of the pitch angle in a rearward pitch direction as the pitch angle exceeds an upper start angle threshold in the rearward pitch direction, and initiates and/or increases amplification of the pitch angle in a forward pitch direction as the pitch angle exceeds a lower start angle threshold in the forward pitch direction, and output the scaled pitch angle as a component of a targeting vector that represents focus within the graphical user interface.

In one example, a method for translating a gaze vector of a human subject to a targeting vector includes receiving sensor data from a sensor system indicating pitch angle of a head of the human subject, translating the pitch angle to a scaled pitch angle according to a scaling function that: initiates and increases amplification of the pitch angle in a rearward pitch direction as the pitch angle exceeds an upper start angle threshold in the rearward pitch direction, initiates and increases amplification of the pitch angle in a forward pitch direction as the pitch angle exceeds a lower start angle threshold in the forward pitch direction, the upper start angle threshold and the lower start angle threshold defining a dead zone of substantially no amplification of the pitch angle, discontinues amplification of the pitch angle in the rearward pitch direction as the pitch angle exceeds an upper end angle threshold in the rearward pitch direction, and discontinues amplification of the pitch angle in the forward pitch direction as the pitch angle exceeds a lower end angle threshold in the forward pitch direction, and outputting the scaled pitch angle as a component of a targeting vector that represents focus within a graphical user interface. In one example, within the above method, the pitch scaling function defines a maximum amplification magnitude in the rearward pitch direction between the upper start angle threshold and the upper end angle threshold and in the forward pitch direction between the lower start angle threshold and the lower end angle threshold.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for translating a gaze vector of a human subject to a targeting vector, the method comprising:
- receiving sensor data from a sensor system indicating pitch angle of a head of the human subject;
- translating the pitch angle to a scaled pitch angle according to a pitch scaling function that initiates and/or increases amplification of the pitch angle in a first direction as the pitch angle exceeds a start angle threshold in the first direction; and
- outputting the scaled pitch angle.

2. The method of claim 1, wherein the pitch angle of the head of the human subject is a component of the gaze vector of the human subject; and
- wherein outputting the scaled pitch angle includes outputting the scaled pitch angle as a component of the targeting vector.

3. The method of claim 2, wherein the sensor data received from the sensor system further indicates a yaw angle component of the gaze vector of the human subject;
- wherein the method further includes translating the yaw angle to a scaled yaw angle according to a yaw scaling function that amplifies the yaw angle in one or more directions, the yaw scaling function differing from the pitch scaling function by a magnitude of amplification across a range of angles; and
- outputting the scaled yaw angle as another component of the targeting vector.

4. The method of claim 2, wherein the targeting vector defines focus within a graphical user interface.

5. The method of claim 1, further comprising:

identifying a gravitational axis based on the sensor data received from the sensor system; and measuring the pitch angle relative to the gravitational axis.

6. The method of claim 1, wherein the pitch scaling function is non-linear across a range of pitch angles; and wherein the pitch scaling function includes a step function component or a non-linear ramp function component beginning at the start angle threshold and continuing across a range of pitch angles in the first direction.

7. The method of claim 1, wherein the pitch scaling function includes a linear ramp function component beginning at the start angle threshold and continuing across a range of pitch angles in the first direction.

8. The method of claim 1, further comprising:

translating the pitch angle to the scaled pitch angle according to the pitch scaling function that further discontinues and/or decreases amplification of the pitch angle in the first direction as the pitch angle exceeds an end angle threshold in the first direction.

9. The method of claim 8, wherein the pitch scaling function defines an amplification magnitude that varies with a change in the pitch angle between the start angle threshold and the end angle threshold.

10. The method of claim 9, wherein the pitch scaling function has a maximum amplification magnitude between the start angle threshold and the end angle threshold.

11. The method of claim 10, wherein the maximum amplification magnitude is closer to the end angle threshold than the start angle threshold.

12. The method of claim 1, wherein the first direction is a rearward pitch direction of the head of the human subject, and the start angle threshold is an upper start angle threshold; and wherein the pitch scaling function initiates and/or increases amplification of the pitch angle in a forward pitch direction opposite the rearward pitch direction as the pitch angle exceeds a lower start angle threshold in the forward pitch direction.

13. The method of claim 12, wherein the upper start angle threshold and the lower start angle threshold define a dead zone in which the pitch angle is not amplified.

14. The method of claim 12, wherein the pitch scaling function is asymmetric about a horizon orthogonal to a gravitational axis in which the upper start angle threshold and the lower start angle threshold have different angle magnitudes relative to the horizon.

15. The method of claim 12, wherein the pitch scaling function is asymmetric about a horizon orthogonal to a gravitational axis such that an angular rate of change of amplification of the pitch angle exceeding the upper start angle threshold in the rearward pitch direction differs from the pitch angle exceeding the lower start angle threshold in the forward pitch direction.

16. The method of claim 12, further comprising:

translating the pitch angle to the scaled pitch angle according to the pitch scaling function that further discontinues and/or decreases amplification of the pitch angle in the rearward pitch direction as the pitch angle exceeds an upper end angle threshold in the rearward pitch direction; and translating the pitch angle to the scaled pitch angle according to the pitch scaling function that further discontinues and/or decreases amplification of the pitch angle in the forward pitch direction as the pitch angle exceeds a lower end angle threshold in the forward pitch direction.

17. The method of claim 16, wherein the pitch scaling function is asymmetric about a horizon orthogonal to a gravitational axis in which the upper end angle threshold and the lower end angle threshold have different angle magnitudes relative to the horizon.

18. The method of claim 1, wherein the pitch scaling function is a user-specific pitch scaling function;

wherein the method further comprises referencing the user-specific pitch scaling function stored in a user profile for the human subject.

19. A computing system, comprising:

an input subsystem to receive sensor data from a sensor system;

a display subsystem to output graphical user interface data representing a graphical user interface to a graphical display device;

a logic machine; and a storage machine holding instructions executable by the logic machine to:

receive the sensor data from the sensor system indicating a pitch angle of a head of a human subject;

translate the pitch angle to a scaled pitch angle according to a scaling function that:

initiates and/or increases amplification of the pitch angle in a rearward pitch direction as the pitch angle exceeds an upper start angle threshold in the rearward pitch direction, and initiates and/or increases amplification of the pitch angle in a forward pitch direction as the pitch angle exceeds a lower start angle threshold in the forward pitch direction; and output the scaled pitch angle as a component of a targeting vector that defines focus within the graphical user interface.

20. A method for translating a gaze vector of a human subject to a targeting vector, the method comprising:

receiving sensor data from a sensor system indicating pitch angle of a head of the human subject;

translating the pitch angle to a scaled pitch angle according to a scaling function that:

initiates and increases amplification of the pitch angle in a rearward pitch direction as the pitch angle exceeds an upper start angle threshold in the rearward pitch direction, initiates and increases amplification of the pitch angle in a forward pitch direction as the pitch angle exceeds a lower start angle threshold in the forward pitch direction, the upper start angle threshold and the lower start angle threshold defining a dead zone of substantially no amplification of the pitch angle, discontinues amplification of the pitch angle in the rearward pitch direction as the pitch angle exceeds an upper end angle threshold in the rearward pitch direction, and discontinues amplification of the pitch angle in the forward pitch direction as the pitch angle exceeds a lower end angle threshold in the forward pitch direction; and outputting the scaled pitch angle as a component of a targeting vector that defines focus within a graphical user interface;

wherein the pitch scaling function defines a maximum amplification magnitude in the rearward pitch direction between the upper start angle threshold and the upper end angle threshold and in the forward pitch direction between the lower start angle threshold and the lower end angle threshold.

* * * * *